(12) United States Patent
Myron et al.

(10) Patent No.: US 11,075,946 B2
(45) Date of Patent: Jul. 27, 2021

(54) HONEYPOT ADAPTIVE SECURITY SYSTEM

(71) Applicant: T-Mobile USA, Inc., Bellevue, WA (US)

(72) Inventors: Peter Myron, Snoqualmie, WA (US); Samson Kwong, Bellevue, WA (US); Michael Mitchell, North Bend, WA (US)

(73) Assignee: T-MOBILE USA, Inc., Bellevue, WA (US)

( * ) Notice: Subject to any disclaimer, the term of this patent is extended or adjusted under 35 U.S.C. 154(b) by 558 days.

(21) Appl. No.: 15/847,584

(22) Filed: Dec. 19, 2017

(65) Prior Publication Data
US 2019/0190951 A1    Jun. 20, 2019

(51) Int. Cl.
*H04L 29/06* (2006.01)

(52) U.S. Cl.
CPC ........ *H04L 63/1491* (2013.01); *H04L 63/107* (2013.01); *H04L 63/20* (2013.01); *H04L 63/1425* (2013.01)

(58) Field of Classification Search
CPC ... H04L 63/1491; H04L 63/20; H04L 63/107; H04L 63/1425; H04L 63/1416; H04L 63/1441; H04L 29/06
USPC ....... 726/1–3, 6–7, 26; 709/223–226; 713/1, 713/100, 152
See application file for complete search history.

(56) References Cited

U.S. PATENT DOCUMENTS

| | | | |
|---|---|---|---|
| 9,692,789 B2 * | 6/2017 | Kirti | H04L 63/20 |
| 9,753,796 B2 * | 9/2017 | Mahaffey | H04W 12/12 |
| 9,774,616 B2 * | 9/2017 | Flores | H04L 63/1433 |
| 9,781,148 B2 * | 10/2017 | Mahaffey | H04L 63/166 |
| 9,794,299 B2 * | 10/2017 | Votaw | H04L 63/08 |
| 2007/0039049 A1 * | 2/2007 | Kupferman | H04L 63/1416 726/22 |
| 2010/0250748 A1 * | 9/2010 | Sivasubramanian | G06F 11/3442 709/226 |
| 2011/0145920 A1 * | 6/2011 | Mahaffey | G06F 21/564 726/22 |

(Continued)

OTHER PUBLICATIONS

Spreitzenbarth et al, "Mobile-Sandbox: combining static and dynamic analysis with machine-learning techniques", 2014, Springer, 14:141-153 (Year: 2014).*

*Primary Examiner* — Saleh Najjar
*Assistant Examiner* — Khalid M Almaghayreh
(74) *Attorney, Agent, or Firm* — Han Santos, PLLC

(57) ABSTRACT

A Honeypot Adaptive Security (HAS) system is described that determines whether a pre-loaded partner or third-party (PP-TP) application executed on a client device has gained over-privileged access to confidential client or network (CCN) data, or over-privileged use of client account features or information provided by a telecommunications service provider. The HAS system is configured to retrieve client data associated with a PP-TP application executed on the client device, retrieve policy rules associated with the PP-TP application, generate a PP-TP application data model to determine a probability of the PP-TP application gaining over-privileged access to CCN data or over-privileged use of client account features on a client device. Responsive to the determined probability, the HAS system is configured to deploy a solution data package to the client device that resolves the instance of over-privileged access or over-privileged use.

20 Claims, 6 Drawing Sheets

(56) References Cited

U.S. PATENT DOCUMENTS

| | | | |
|---|---|---|---|
| 2013/0347116 A1* | 12/2013 | Flores | H04L 63/1433 726/25 |
| 2014/0214668 A1* | 7/2014 | Lotter | G06F 21/6218 705/41 |
| 2016/0242143 A1* | 8/2016 | Lotter | G06F 21/6272 |
| 2016/0248810 A1* | 8/2016 | Majaniemi | G06F 21/53 |
| 2017/0251013 A1* | 8/2017 | Kirti | H04L 63/1441 |
| 2017/0302551 A1* | 10/2017 | Chen | H04L 67/22 |
| 2017/0372067 A1* | 12/2017 | Kim | H04L 9/0643 |
| 2018/0027006 A1* | 1/2018 | Zimmermann | G06F 9/46 726/11 |
| 2018/0375886 A1* | 12/2018 | Kirti | H04L 63/104 |
| 2019/0068627 A1* | 2/2019 | Thampy | H04L 63/1416 |
| 2019/0324734 A1* | 10/2019 | Prasad | G06F 11/302 |

\* cited by examiner

HONEYPOT ADAPTIVE SECURITY SYSTEM

BACKGROUND

Mobile telecommunication devices have evolved from simply providing two-way audio communications, to providing a computing platform that facilitates execution of sophisticated software applications. These software applications may access client data, client account features such as a bandwidth allocation, or service provider data to facilitate their operation on a client device. Typically, access permissions associated with software applications may govern the types of client data, service provider data, or client account features that the software application may access on the client device. For example, access permissions may be governed by a terms of use agreement that affirmatively restricts software applications from gaining access to confidential client or network (CCN) data. In one example, a software application may be permitted access to a client name from a client profile, but not financial data, such as a credit card number. Notwithstanding, software applications may inadvertently, or maliciously, access such CCN data, which in turn compromises an integrity of the end user or telecommunications service provider.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
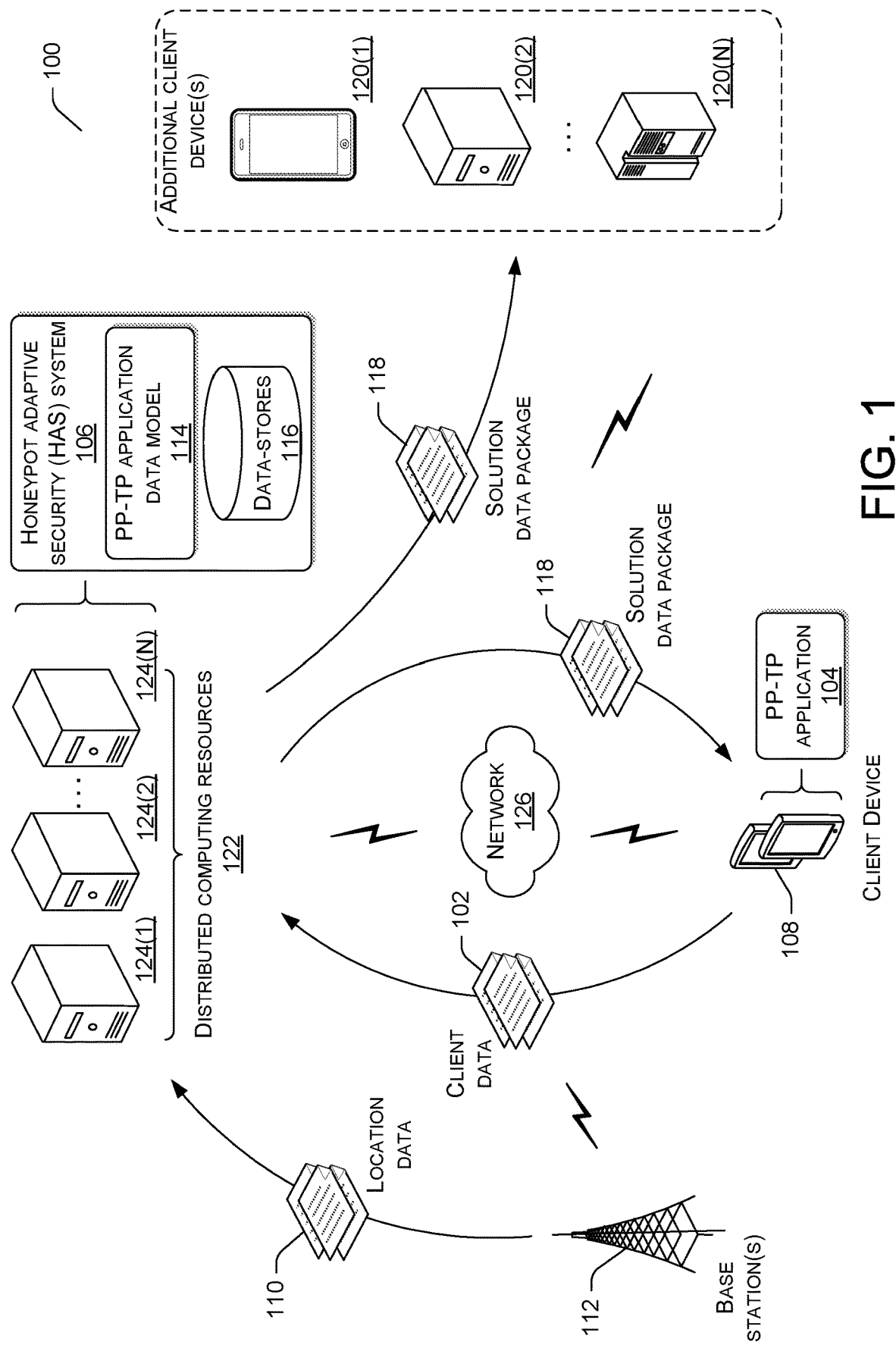
FIG. 1 illustrates a schematic view of a computing environment that facilitates an analysis of client data associated with a Preloaded Partner and Third Party (PP-TP) application executed on a client device.

This disclosure describes techniques that facilitate an analysis of client data associated with a pre-loaded partner or third-party ("PP-TP," hereinafter) application executed on a client device. Particularly, a Honeypot Adaptive Security (HAS) system is described that may determine whether a PP-TP application has gained over-privileged access to confidential client or network (CCN) data, or over-privileged use of client account features, on a client device. In doing so, the HAS system may selectively generate and deploy a policy solution that resolves an instance of over-privileged access to CCN data or over-privileged access to client account feature on the client device.

In some examples, CCN data may include confidential client information, such as a client device phone number, a credit card number, address data, email address data, email message, or any other client profile data designated by a service provider, or client, as confidential. Further, CCN data may include proprietary network data that is designated by the telecommunications service provider, as confidential.

Additionally, a client account feature may correspond to a quality of service feature or a network accessibility feature associated with a telecommunications service provider that facilitates execution of a PP-TP application on the client device. In one example, a client account feature may correspond to a bandwidth allocation that is associated with execution of a PP-TP application on the client device. The subscriber plan associated with the client device may allot a predetermined bandwidth allocation for execution of the PP-TP application on the client device. Thus, any bandwidth usage that exceeds the predetermined allocation may be considered an over-privileged use of the client account feature. In another example, a client account feature may be associated with resolution of an audio, video, or image file, whereby resolution may be controlled at a predetermined level to maintain network efficiencies.

Typically, a PP-TP application is permitted access to portions of client data or client account features to facilitate its execution on a client device. However, the breadth of access permissions may limit or affirmatively restrict access to confidential client or network (CCN) data associated with the end user of the client device, the telecommunications service provider that facilitates communications via the client device, or a combination of both. Thus, the HAS system is configured to monitor execution of a PP-TP application and detect instances of over-privileged use of CCN data or over-privileged use of client account features on the client device.

Particularly, the HAS system may selectively retrieve client data associated with a PP-TP application directly from an operating system stack of a client device or from a monitoring agent that is instrumented on the client device. Client data may include records (i.e., data logs) of system activities associated with execution of the PP-TP application on the client device, such as network activity, file system activity, screen display activity, client device logs, or any combination thereof. Further, the monitoring agent may be instrumented to retrieve client data from anywhere on the client device, where data is exposed. For example, the HAS system may retrieve client data from an operating system stack of the client device, a graphic processor, volatile and non-volatile memory, disk storage, network interfaces, input/output interfaces, or any combination thereof.

In doing so, the HAS system may generate or refine a PP-TP application data model based at least in part on client data associated with the PP-TP application. The PP-TP application data model may be used to determine emerging trends of systemic problems associated with the PP-TP application, its use of CCN data, over-privileged access of client account features, and so forth.

For example, an emerging trend of systemic problems may correspond to an occurrence of a number of instances of over-privileged access to confidential client or network (CCN) data or over-privileged access of client account features that occur over a predetermined time interval. In a non-limiting example, the HAS system may determine that over-privileged access to CCN data by a particular PP-TP application is an emerging trend of systemic problems in response to determining that the occurrence of a number instances of such access is greater than or equal to a predetermined number of instances. In some examples, an administrator of the HAS system may set the predetermined number of instances, which may correspond to one, five, or ten. Any number of predetermined number of instances is possible.

The HAS system may aggregate client data from the client device with additional client data from other client devices. Doing so may help identify data patterns associated with usage of the PP-TP application in different conditions.

Further, the HAS system may refine the PP-TP application data model by introducing environmental parameters, policy rules, device information, and historical client data from one or more data-stores. Environmental parameters may quantify characteristics that affect over-privileged access to CCN data, or over-privileged use of client account features. These characteristics may include geographic regions, network access points, device types, historical instances of a PP-TP application gaining over-privileged access of CCN data or over-privileged use of client account features, or any combination thereof. Policy rules may determine an appropriate use of CCN data and client account features by a PP-TP application on a client device. In one example, a policy rule may indicate that a PP-TP application may access some, but not all, CCN data associated with a client device. In another example, a policy rule may quantify a threshold value for a client account feature that governs an interaction between a PP-TP application and client device. Device information may include a device type, device identifier, and configuration of a client device that is used to execute the PP-TP application. Further, historical client data may include a historical record of client data associated with one or more PP-TP applications and one or more client device(s).

Moreover, the PP-TP application data model may be used to determine a probability of whether a PP-TP application may gain over-privileged access of CCN data or over-privileged use of client account features on the client device. Responsive to the determined probability, the HAS system may selectively parse a portion, or substantially all, client data to identify instances of over-privileged access of CCN data or over-privileged use of client account features. For example, the HAS system may determine that the probability of a PP-TP application gaining over-privileged access of CCN data or over-privileged use of client account features is less than a predetermined threshold. In this example, the HAS system may selectively parse a portion, but not all, client data to identify instances of over-privileged access of CCN data or over-privileged use of client account features on the client device. Alternatively, the HAS system may determine that the probability of a PP-TP application gaining over-privileged access of CCN data or over-privileged use of client account features is greater than a predetermined threshold. In this latter example, the HAS system may selectively parse substantially all client data to identify instances of over-privileged access of CCN data or over-privileged use of client account features on the client device.

Additionally, in response to identifying an instance of over-privileged access of CCN data or over-privileged use of client account features, the HAS system may determine whether a policy solution is available. Particularly, the HAS system may access a policy solution from a policy data-store to identify an appropriate policy solution. In doing so, the HAS system may generate a solution data package that automatically executes the policy solution on the client device. The solution data package may also include an alert that is intended to inform at least an end user of the client device of the instance of over-privileged access to CCN data or over-privileged use of a client account feature. Additionally, or alternatively, the alert may be transmitted to a developer of the PP-TP application, a system administrator of a business enterprise associated with the end user of the client device (i.e., information technology department), an administrator of the telecommunications service provider, or any combination thereof.

In some examples, the HAS system may determine that a policy solution is not available. In doing so, the HAS system may transmit an alert indicating that an instance of over-privileged access of CCN data or over-privileged use of client account features has occurred, and that a policy solution is not available. The alert may be transmitted to an end user of the client device, a developer of the PP-TP application, a system administrator of a business enterprise associated with the end user of the client device (i.e., information technology department), an administrator of the telecommunications service provider, or any combination thereof. Alternatively, or additionally, the HAS system may selectively generate a solution data package that automatically prevents execution of the PP-TP application on the client device, until a policy solution is available.

Further, the HAS system may determine whether additional client device may be affected by a PP-TP application gaining over-privileged access of CCN data or over-privileged use of client account features. Particularly, the HAS system may identify data patterns within a PP-TP application data model, that correlate characteristics, such as a geographic location, device type, network access point, or any combination thereof, with historical instances of a PP-TP application gaining over-privileged access of CCN data or over-privileged access of client account features. In doing so, the HAS system may identify a set of additional client devices based at least in part on the shared characteristics.

Moreover, the term "techniques," as used herein, may refer to system(s), method(s), computer-readable instruction(s), module(s), algorithms, hardware logic, and/or operation(s) as permitted by the context described above and through the document.

FIG. 1 illustrates a schematic view of a computing environment 100 that facilitates an analysis of client data 102 associated with a PP-TP application 104 executed on a client device. Particularly, a Honeypot Adaptive Security (HAS) system 106 is configured to identify and resolve instances of a PP-TP application 104 gaining over-privileged access to CCN data or over-privileged use of client account features on a client device. The HAS system 106 may receive client data 102 that is associated with a PP-TP application 104 executed on a client device 108. The client data 102 may be retrieved directly from an operating system stack on the client device 108, or from a monitoring agent that is instrumented to monitor data communications between the client device 108 and the PP-TP application 104. Client data 102 may include records of system activities associated with execution of the PP-TP application 104 on the client device, such as network activity, file system activity, screen display activity, client device logs, or any combination thereof.

Further, the HAS system 106 may retrieve location data 110 from one or more base-station node(s) 112 associated with a telecommunications service provider. The location data may be used to identify a geographic location of the client device 108, or a network access point used by the client device, at a point in time that substantially correlates with receipt of client data 102 from the client device 108. In doing so, the HAS system 106 may identify whether an instance of over-privileged access to CCN data or over-privileged use of client account features is based at least in part on the geographic location or network access point.

In the illustrated example, the HAS system 106 may analyze the client data 102, relative to a PP-TP application data model 114. Particularly, the HAS system 106 may develop and refine the PP-TP application data model 114 by aggregating client data 102 from the client device 108 with one or more of environmental parameters, device data, policy data, or historical client data. The environmental parameters, device data, policy data, and historical client data may be stored within data-stores 116 available to the HAS system 106. The data-stores 116 may be maintained by the HAS system 106, a telecommunications service provider, or a combination of both.

Further, the HAS system 106 may generate a policy solution to resolve instances of a PP-TP application 104 gaining over-privileged access of CCN data or over-privileged use of client account features. The HAS system 106 may generate and deploy the policy solution in a solution data package 118 to the client device 108 and additional client device(s) 120(1)-120(N) that may be affected by instances of over-privileged access of CCN data or over-privileged use of client account features.

In the illustrated example, the HAS system 106 may operate on one or more distributed computing resource(s) 122. The one or more distributed computing resource(s) 122 may include one or more computing device(s) 124(1)-124(N) that operate in a cluster or other configuration to share resources, balance load, increase performance, provide failover support or redundancy, or for other purposes. The one or more computing device(s) 124(1)-124(N) may include one or more interface(s) to enable communications with other networked devices, such as one of client device 108, or additional client device(s) 120(1)-120(N), via one or more network(s) 126. The one or more network(s) 126 may include public networks such as the Internet, private networks such as an institutional and/or personal intranet, or some combination of private and public networks. The one or more network(s) 126 can also include any type of wired and/or wireless network, including but not limited to local area network (LANs), wide area networks (WANs), satellite networks, cable networks, WI-FI (Registered trademark) networks Max WI-MAX (Registered trademark) networks, mobile communications networks (e.g. 3G, 4G, and so forth), or any combination thereof.

Further, the client device 108 and additional client device(s) 120(1)-120(N) may include any sort of electronic device, such as a cellular phone, a smart phone, a tablet computer, an electronic reader, a media player, a gaming device, a personal computer (PC), a laptop computer, etc. The client device 108 and additional client device(s) 120(1)-120(N) may include a subscriber identity module (SIM), such as an eSIM, to identify the client device 108 and additional client device(s) 120(1)-120(N) to a telecommunication service provider network (also referred to herein, as "telecommunication network").

Figure 2:
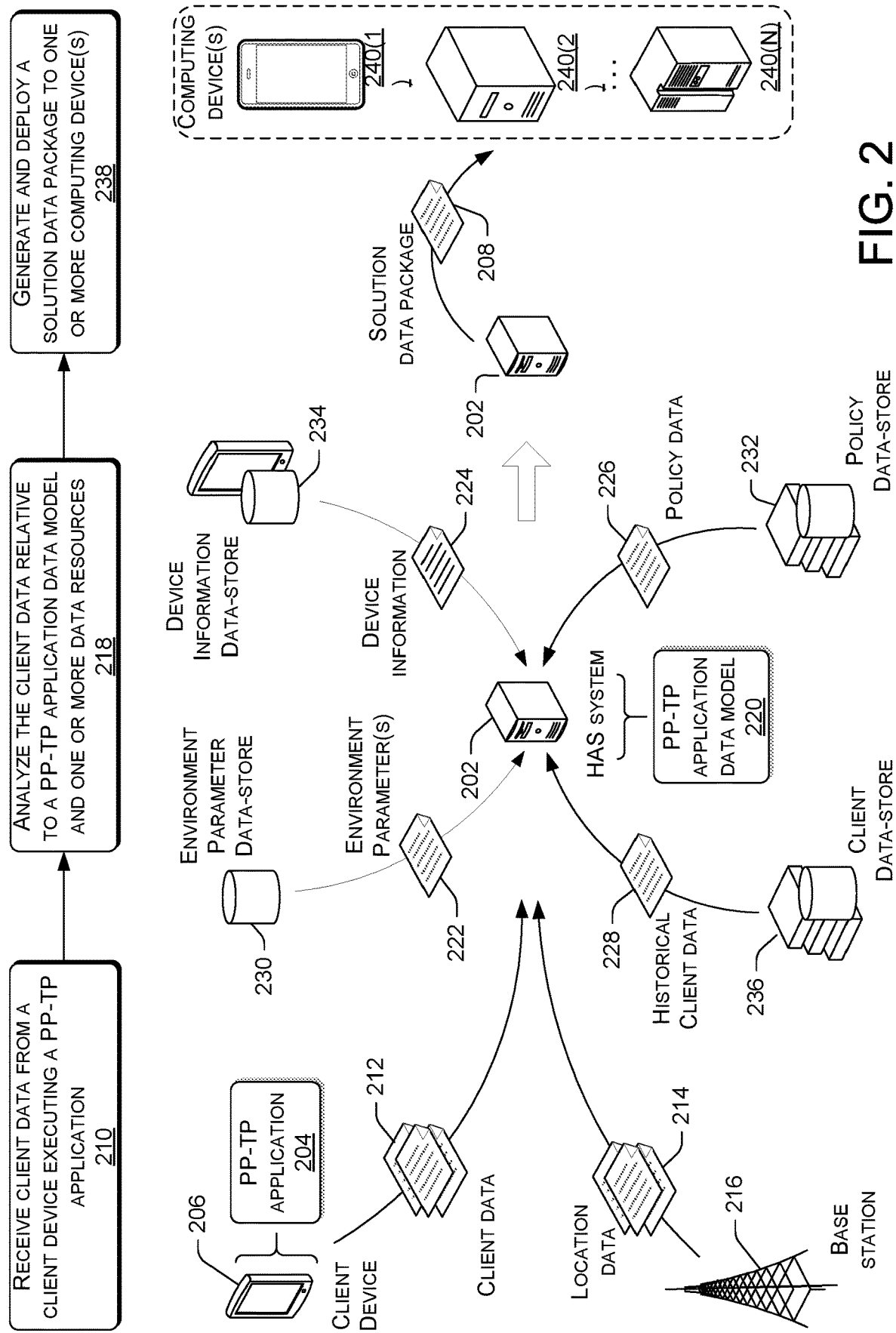
FIG. 2 illustrates a block diagram of a Honeypot Adaptive Security (HAS) system that that may generate and deploy a solution data package that is associated with an instance of a PP-TP application gaining over-privileged access of CCN data or over-privileged access to client account features.

FIG. 2 illustrates a block diagram of a HAS system 202 that is configured to identify and resolve instances of a PP-TP application 204 gaining over-privileged access of CCN data or over-privileged access of client account features, on a client device 206. The HAS system 202 may correspond to HAS system 106. In some examples, the HAS system 202 may generate and deploy a solution data package 208 to one or more computing devices 240 to resolve or draw attention to instances of over-privileged access of CCN data or over-privileged access of client account features.

At block 210, the HAS system 202 may receive client data 212 associated with a PP-TP application 204 executed on a client device 206. Client data 212 may records of system activities associated with execution of the PP-TP application 204 on the client device, such as network activity, file system activity, screen display activity, client device logs, or any combination thereof. The client data 212 may be retrieved directly from an operating system stack on the client device 206, or from a monitoring agent that is instrumented to monitor data communications between the client device 206 and the PP-TP application 204 on the client device 206. Data communications may include network traffic via network interfaces, file system right calls, or data transfers between the PP-TP application 204 and components of the client device 206.

Further, the HAS system 202 may retrieve location data 214 from a base station node 216 associated with a telecommunications service provider. The HAS system 202 may correlate a geographic location of the client device 206, or a network access point used by the client device 206, with a point in time that substantially correlates with receipt of client data 212 from the client device 206. In doing so, the HAS system 202 may determine whether an instance of over-privileged access of CCN data or over-privileged use of client account features is based at least in part on the geographic location, or the network access point.

At block 218, the HAS system 202 may analyze the client data 212 relative to a PP-TP application data model 220 and one or more data resources. Particularly, the HAS system 202 may generate and/or refine a PP-TP application data model 220, based at least in part on the client data 212 from the client device 206. The PP-TP application data model 220 may be used to determine emerging trends of systemic problems associated with the PP-TP application 204, its over-privileged access of CCN data, or over-privileged use of client account features on the client device 206. The HAS system 202 may develop and refine the PP-TP application data model 220 by aggregating client data 212 from the client device 206 with one or more of environmental parameters 222, device information 224, policy data 226, and historical client data 228. The environmental parameters 222, device information 224, policy data 226, and historical client data 228 may be maintained by the HAS system 202, a telecommunications service provider, or a combination of both.

The environmental parameters 222 may be retrieved from an environmental parameter data-store 230. Environmental parameters 222 may relate to characteristics that affect over-privileged access to CCN data, or over-privileged use of client account features. These characteristics may be based on geographic regions, network access points, device types, historical instances of a PP-TP application 204 gaining over-privileged access of CCN data or over-privileged use of client account features, or any combination thereof. The policy data 226 may be retrieved from a policy data-store 232. The policy data 226 may include policy rules that determine an appropriate use of CCN data and client account features, by a PP-TP application 204 on a client device 206.

The device information 224 may be retrieved from a device information data-store 234. The device information 224 may include a device type, device identifier, and configuration (i.e., firmware configuration, operating system configuration, and so forth) of a client device 206 that is used to execute the PP-TP application 204.

The historical client data 228 may be retrieved from a client data-store 236. The historical client data 228 may include a historical record of client data 212 associated with one or more PP-TP applications and one or more client device(s).

At block 238, the HAS system 202 may identify patterns between client data 212 and the PP-TP application data model 220 to determine a probability that the PP-TP application 204 has gained over-privileged access of CCN data or over-privileged use client account features on a client device. In doing so, the HAS system 202 may analyze a portion, or substantially all, client data 212 to identify instances of over-privileged access of CCN data or over-privileged use of client account features, based at least in part on the determined probability.

Moreover, the HAS system 202 may generate and deploy a solution data package 208 to one or more computing device(s) 240(1)-240(N), in response to identifying an instance of over-privileged access of CCN data or over-privileged use of client account features. The solution data package 208 may include a policy solution that resolves an instance of a PP-TP application 204 gaining over-privileged access of CCN data or over-privileged use of client account features, on a client device 206. Further, the one or more computing device(s) 240(1)-240(N) may include the client device 206, additional client devices identified as likely affected by an instance of over-privileged access of CCN data or over-privileged use of client account features, a system administrator of a business enterprise associated with the end user of the client device 206 (i.e., information technology department), a developer associated with the PP-TP application 204, an administrator associated with the telecommunications service provider, or any combination thereof.

Figure 3:
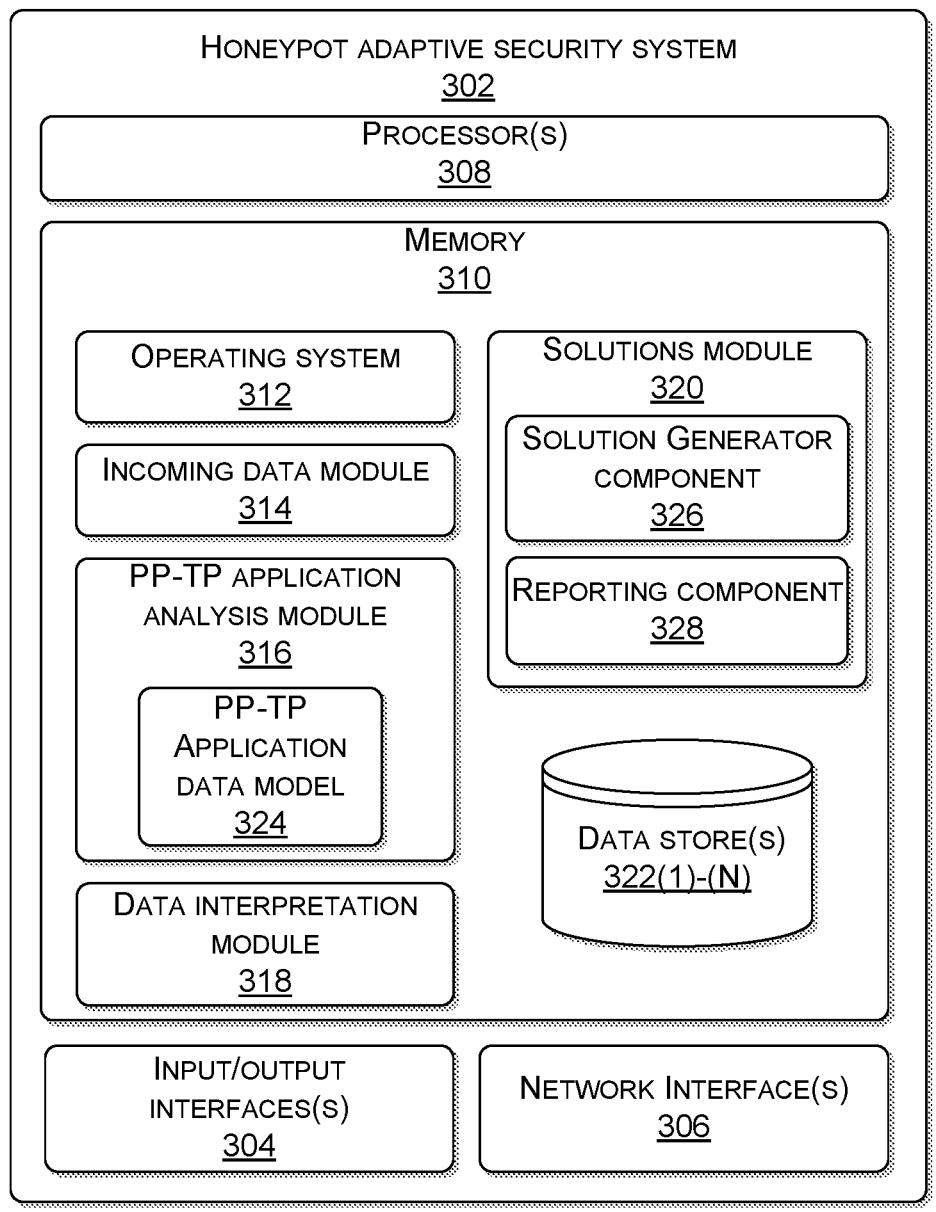
FIG. 3 illustrates a block diagram of a HAS system that monitors and identifies instances of a PP-TP application gaining over-privileged use of CCN data or over-privileged use of client account features on a client device.

FIG. 3 illustrates a block diagram of a HAS system 302 that monitors and identifies instances of a PP-TP application gaining over-privileged use of CCN data or over-privileged use of client account features on a client device. The HAS system 302 may correspond to HAS system 106 or 202. Particularly, the HAS system 302 may monitor data transmission associated with PP-TP application such as network activity, file system activity, client device logs, or system information associated with the client device. In doing so, the HAS system 302 may determine whether a PP-TP application has gained over-privileged accessed of CCN data or over-privileged use of client account features, such as exceeding a predetermined bandwidth allocation that is associated with the PP-TP application.

The HAS system 302 may include routines, program instructions, objects, and/or data structures that perform particular tasks or implement abstract data types. Further, the HAS system may include input/output interface(s) 304. The input/output interface(s) 304 may include any type of output interface known in the art, such as a display (e.g., a liquid crystal display), speakers, a vibrating mechanism, or a tactile feedback mechanism. Input/output interface(s) 304 also include ports for one or more peripheral devices, such as headphones, peripheral speakers, or a peripheral display. Further, the input/output interface(s) 304 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the HAS system 302 may include network interface(s) 306. The network interface(s) 306 may include any sort of transceiver known in the art. For example, the network interface(s) 306 may include a radio transceiver that performs the function of transmitting and receiving radio frequency communications via an antenna. In addition, the network interface(s) 306 may also include a wireless communication transceiver and a near field antenna for communicating over unlicensed wireless Internet Protocol (IP) networks, such as local wireless data networks and personal area networks (e.g. BLUETOOTH (Registered trademark) or near field communication (NFC) networks). Further, the network interface(s) 306 may include wired communication components, such as an Ethernet port or a Universal Serial Bus (USB).

Further, the HAS system 302 may include one or more processor(s) 308 that are operably connected to memory 310. In at least one example, the one or more processor(s) 308 may be a central processing unit(s) (CPU), graphics processing unit(s) (GPU), a both a CPU and GPU, or any other sort of processing unit(s). Each of the one or more processor(s) 308 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 308 may also be responsible for executing all computer applications stored in the memory, which can be associated with common types of volatile (RAM) and/or nonvolatile (ROM) memory.

In some examples, memory 310 may include system memory, which may be volatile (such as RAM), non-volatile (such as ROM, flash memory, etc.) or some combination of the two. The memory may also include additional data storage devices (removable ad/or non-removable) such as, for example, magnetic disks, optical disks, or tape.

The memory 310 may further include non-transitory computer-readable media, such as volatile and nonvolatile, removable and non-removable media implemented in any method or technology for storage of information, such as computer readable instructions, data structures, program modules, or other data. System memory, removable storage and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 310 may include an operating system 312, an incoming data module 314, a PP-TP application analysis module 316, a data interpretation module 318, a solution modules 320, and one or more data-store(s) 322(1)-(N). By way of example, the one or more data store(s) may include an environmental parameters data-store 322(1), a policy data-store 322(2), a device information data-store 322(3), and a client data-store 322(4). The operating system 312 may be any operating system capable of managing computer hardware and software resources.

The incoming data module 314 may selectively retrieve client data associated with a PP-TP application executed on a client device. Client data may include records of system activities associated with execution of PP-TP application on the client device, such as network activity, file system activity, screen display activity, client device logs, or any combination thereof. In one example, the incoming data module 314 may retrieve client data directly from an operating system stack of the client device. In another example, the incoming data module 314 may retrieve client data from a monitoring agent that is instrumented anywhere on a client device where data is exposed. Particularly, the monitoring agent may monitor network traffic, file system right calls, or data transfers between the PP-TP application and components of the client device.

Alternatively, or additionally, the incoming data module 314 may retrieve client data, via a monitoring agent or otherwise, from anywhere on the client device, where data is exposed, such as, but not limited to, a graphic processor, volatile and non-volatile memory, disk storage, network interfaces, or input/output interfaces.

Further, the incoming data module 314 may further retrieve location data of a client device from a base-station node associated with the telecommunications service provider. Particularly, the incoming data module 314 may request location data for a client device based on a device identifier, such as an International Mobile Equipment Identity (IMEI) number. In doing so, the HAS system 302 may identify a geographic location of the client device, or a network access point used by the client device, at a point in time that substantially correlates with receipt of client data from the client device. Doing so may help identify whether an instance of over-privileged access of CCN data or over-privileged use of client account features is based at least in part on the geographic location or network access point.

The incoming data module 314 may retrieve client data directly from a client device or monitoring agent on the client device, on a continuous basis, per a predetermined schedule, or in response to a triggering event. The predetermined schedule may be based on a time interval of thirty minutes, one hour, 12 hours, or 24 hours. Any time interval is possible. Further, the triggering event may correspond to receipt from other client devices of an over-privileged use of CCN data or client account feature, by a PP-TP application executed on the client device.

The PP-TP application analysis module 316 may generate a statistical model that is associated with the PP-TP application, based at least in part on client data associated with the PP-TP application. The PP-TP application data model 324 may be used to determine an emerging trend of a systemic problem associated with a PP-TP application, its use of CCN data or over-privileged access to client account features (i.e., exceeding a predetermined bandwidth allocation that is associated with the PP-TP application). Particularly, the PP-TP application data model 324 may be used to determine a probability of a PP-TP application gaining over-privileged access to CCN data or over-privileged use of client account features (i.e., exceeding a predetermined bandwidth allocation). In a non-limiting example, the PP-TP application analysis module 316 may aggregate client data from the client device with additional client data from other client devices. Doing so may help identify data patterns associated with usage of the PP-TP application in different conditions. Development of the PP-TP application data model 324 may be an iterative process. Client data from one or more client device(s), or one or more predetermined time period(s), or a combination thereof, may be continuously evaluated to progressively refine the PP-TP application data model 324. As more client data becomes available, a continuously more accurate PP-TP application data model 324 may be developed.

In some examples, the PP-TP application analysis module 316 may refine the PP-TP application data model 324 by introducing environmental parameters from an environmental parameter data-store 322(1), policy rules from a policy data-store 322(2), device information from a device information data-store 322(3), and historical client data from a client data-store 322(4).

In one example, machine learning may be used to construct algorithms that can learn from and make predictions relating to vulnerability of CCN data via a PP-TP application. Such algorithms may operate by building a model from stored data resources such as prior client data from one or more client devices, instances of CCN data being exposed through use of a PP-TP application, environmental parameters, device information, or any combination thereof. Further, machine learning may build a PP-TP application data model 324 to make data-driven predictions, decisions, or provide threshold conditions that indicate a vulnerability of CCN data being exposed via a PP-TP application, or any combination thereof.

In some examples, the machine learning herein may be supervised or unsupervised. In supervised learning, the PP-TP application analysis module 316 may be presented with historical client data from the client data store 322(4) as being acceptable. In one example, example data may correspond to client data whereby CCN data of an end user had been compromised through use of the PP-TP application. Alternatively, or additionally, example data may correspond to client data whereby CCN data of an end user had not been comprised. Put differently, the client data-store 322(4) acts as a teacher for the PP-TP application analysis module 316. In unsupervised learning, the client data-store 322(4) does not provide any labels as what is acceptable; rather, it simply provides historic data to the PP-TP application analysis module 316 that can be used to finds its own structure. In some examples, the PP-TP application data model 324 may be different for different types of client devices and different environments.

In various embodiments, the machine learning may make use of techniques such as supervised learning, unsupervised learning, semi-supervised learning, naive Bayes, Bayesian networks, decision trees, neural networks, fuzzy logic models, and/or probabilistic classification models.

In the illustrated example, the data interpretation module 318 may analyze client data that is retrieved by the incoming data module 314 relative to a PP-TP application data model 324. Particularly, the data interpretation module 318 may identify data patterns between client data associated with a PP-TP application being executed on a client device, and a PP-TP application data model 324 that corresponds to the PP-TP application. In doing so, the data interpretation model may determine a probability of whether the PP-TP application native on the client device may have over-privileged access to CCN data of an end user or over-privileged access to client account features (i.e., exceeding a predetermined bandwidth allocation that is associated with the PP-TP application). In one example, the data interpretation module 318 may determine that the probability of the PP-TP application compromising CCN data is greater than a predetermined threshold. In doing so, the data interpretation module 318 may parse substantially all client data to identify instances of over-privileged access of CCN data. In another example, the data interpretation module 318 may determine that the probability of the PP-TP application gaining over-privileged access of CCN data is less than a predetermined threshold. In this example, the data interpretation module 318 may selectively parse a portion, but not all, client data.

Additionally, the data interpretation module 318 may determine a probability of whether bandwidth usage by the PP-TP application on the client device exceeds a predetermined bandwidth allocation. In this example, in response to determining that the probability is greater than a predetermined threshold, the data interpretation module 318 may analyze portions of client data, such as client device logs, to quantify bandwidth consumption by the PP-TP application on the client device.

In some examples, the probability of the PP-TP application may be an alpha-numeric expression (i.e., 0 to 10, or A to F), a descriptive expression (i.e., low, medium, or high), based on color (i.e., red, yellow, green), or any other suitable scale, or combination thereof. Additionally, CCN data may include a client device phone number, a credit card number, address data, email address data, email message, or any other client profile data designated by a service provider, or client, as confidential.

Moreover, the data interpretation module 318 may determine whether additional client devices are affected by instances of a PP-TP application gaining over-privileged access of CCN data or over-privileged access of client account features. In this example, the data interpretation module 318 may identify data patterns within a PP-TP application model that correlate characteristics such as a geographic location, device type, network access point, or any combination thereof, with historical instances of a PP-TP application gaining over-privileged access of CCN data or over-privileged access of a client account feature (i.e., exceeding a predetermined bandwidth allocation that is associated with the PP-TP application). In doing so, the data interpretation module 318 may determine a probability of whether the PP-TP application will affect additional client devices based on the data patterns within the PP-TP application data model 324. Further, the data interpretation module 318 may identify a set of additional client devices, from the client data-store 322(4), based on the determined probability (i.e., whether the PP-TP application will affect additional client devices) being greater than a predetermined threshold.

In the illustrated example, the solutions module 320 may include a solution generator component 326 and a reporting component 328. The solution generator component 326 may receive an indication from the data interpretation module 318 that a PP-TP application native on a client device has over-privileged access to CCN data or client account features, such as a bandwidth allocation. In doing so, the solution generator component 326 may access policy data from the policy data-store 322(2) to retrieve an appropriate policy solution. The policy solution may comprise instructions and/or code that is tailored for a particular client device type, a particular PP-TP application, an instance of over-privileged access to CCN data, an instance of over-privileged access to client account features (i.e., exceeding a predetermined bandwidth allocation that is associated with the PP-TP application), or any combination thereof.

In one example, the solution generator component 326 may receive an indication, from the data interpretation module 318, that a PP-TP application has gained over-privileged access to CCN data on a client device. In doing so, the solution generator component 326 may access a policy solution, from the policy data-store 322(2), that resolves the instance of over-privileged access of CCN data on the client device. The policy solution may include an automated adjustment to client account settings, PP-TP application access privileges, operating system settings on the client device, or any combination thereof. In another example, the solution generator component 326 may receive an indication, from the data interpretation module 318, that data transmissions associated with a PP-TP application native on a client device have exceeded a predetermined bandwidth allocation. In doing so, the solution generator component 326 may access an appropriate policy solution from the policy data-store 322(2) that throttles data transmissions associated with the PP-TP application. The policy solution may include an automated adjustment of network settings and PP-TP application access privileges on the client device.

Furthermore, the solution generator component 326 may determine that a policy solution does not exist for the instance of over-privileged access to CCN data or over-privileged use of a client account features. In this example, the solution generator component 326 may generate an alert intended for at least one of the end user of the client device, a developer of the PP-TP application, and an administrator of telecommunications service provider, indicating that an instance of over-privileged access to CCN data or over-privileged use of a client account feature has occurred, and that a policy solution is not available. Alternatively, or additionally, the solution generator component 326 may selectively generate a solution data package that automatically prevents execution of the PP-TP application on the client device, until a policy solution is available.

Additionally, the reporting component 328 of the solutions module 320 may be operative to report instances of over-privileged access of CCN data or over-privileged use of client account features, to one or more recipients in the form of a solution data package. In one example, the solution data package may be sent to the client device, a system administrator of a business enterprise associated with the end user (i.e., information technology department), a developer associated with the PP-TP application, an administrator associated with the telecommunications service provider, or any combination thereof. In various examples, the solution data package may be sent via a common short code (CSC) using a short message service (SMS), multimedia messaging service (MMS), an e-mail service, via audio communication service, or via a social media platform.

In another example, the solution data package may be transmitted to a set of additional client devices that are identified as likely affected by an instance of a PP-TP application gaining over-privileged access of CCN data or over-privileged use of client account features. The set of additional client devices may be identified by the data interpretation module 318 based at least in part on data patterns within the PP-TP application data model 324. In a non-limiting example, the data patterns may correlate characteristics such as a geographic location, device type, network access point, or any combination thereof, with historical instances of a PP-TP application gaining over-privileged access of CCN data or over-privileged access of a client account feature (i.e., exceeding a predetermined bandwidth allocation that is associated with the PP-TP application).

The solution data package may include a policy solution that resolves an instance of over-privileged access to CCN data or over-privileged use of a client account feature, on a client device. In one example, the solution data package may automatically execute the policy solution on the client device. The policy solution may comprise of computer executable instructions that adjust network settings on a client device, access privileges associated with a PP-TP application, client account settings associated with the client device, operating system settings on the client device, or any combination thereof.

Further, the solution data package may be operative to generate an alert that informs an end user, developer, or administrator, of an instance of over-privileged access of CCN data or over-privileged use of client account features by a PP-TP application. The alert may indicate that a policy solution has resolved an instance of over-privileged access to CCN data or over-privileged use of a client account feature on a client device. Alternatively, the alert may indicate that an instance of over-privileged access of CCN data or over-privileged use of a client account feature has been detected on a client device, and a policy solution is not available. In this latter instance, the solution data package may include computer executable instructions that automatically prevent execution of the PP-TP application on the client device, until a policy solution is available.

In the illustrated example, the HAS system 302 may include one or more data-store(s) 322(1)-(N), such as an environmental parameters data-store 322(1), a policy data-store 322(2), a device information data-store 322(3), and a client data-store 322(4). The data-store(s) 322(1)-(4) may correspond to data-stores 116. In some examples, the data-store(s) 322(1)-(4) may be native to the HAS system 302. In other examples, the data-store(s) 322(1)-(4) may be maintained within a core network of a telecommunications service provider that is accessible by the HAS system 302.

In one example, the environmental parameters data-store 322(1) may include one or more environmental parameters. The environmental parameters may quantify characteristics that affect over-privileged use of CCN data by a PP-TP application on a client device, or over-privileged access of client account features on a client device. These characteristics may include geographic regions, network access points, device types, historical instances of a PP-TP application gaining over-privileged access of CCN data or over-privileged use of client account features, or any combination thereof. In a non-limiting example, an environmental parameter may reflect a characteristic whereby over-privileged access of CCN data is more prevalent in a particular geographic region relative to other geographic regions.

Each environmental parameter may be expressed as a score, and each score may be alpha-numeric (i.e., 0 to 10, or A to F), descriptive (i.e., low, medium, or high), based on color (i.e., red, yellow, green), or any other suitable rating scale, or combination thereof.

The policy data-store 322(2) may include one or more policy rules. The policy rules may be used to determine an appropriate use of CCN data, or client account features, by a PP-TP application on a client device. In one example, policy rules may expressly identify types of CCN data that a PP-TP application may not access. For instance, a policy rule may indicate that a PP-TP application may be authorized to access a name and email address of an end user, but not the end user's credit card information. In another example, a policy rule may quantify a threshold value for a client account feature that governs an interaction between a PP-TP application and the client device. For instance, a policy rule may associate a predetermined bandwidth allocation with execution of a PP-TP application on a client device. In this example, bandwidth usage by the PP-TP application that is greater than the predetermined bandwidth allocation is deemed an over-privileged use of the client account feature (i.e., bandwidth allocation). The predetermined bandwidth allocation may be calculated automatically by a computing device associated with a service provider, set by a client, administrator of the telecommunications service provider, prescribed by a service plan associated a client account of the end user.

Additionally, the policy data-store 322(2) may include policy solutions associated with instances of a PP-TP application gaining over-privileged access of CCN data or over-privileged use of client account features on a client device. Policy solutions may comprise of instructions and/or code that is tailored for a particular client device type, a particular PP-TP application, an instance of over-privileged access to CCN data, an instance of over-privileged access to client account features, or any combination thereof. The policy data-store 322(2) may periodically adjust policy rules and policy solutions for instances of a PP-TP application gaining over-privileged access of CCN data or over-privileged use of client account features.

The device information data-store 322(3) may provide the HAS system 302 with device information. Device information may include a device type, device identifier, and configuration of a client device that is used to execute the PP-TP application. Further, device information may include an Internet Protocol (IP) address of one or more networks accessed by the client device, along with a time and date stamp that correspond to instances of network access. In one example, the device identifier may correspond to IMEI number. The IMEI number may be used to retrieve a geographic location of the client device from a base-station node associated with the telecommunications service provider.

The device information may further indicate one or more PP-TP applications native on a client device, along with the platform, configuration, technical capabilities, security capabilities, feature settings, and operational status of the client device. For example, device data of a client device may indicate a device type, firmware, memory, processor, and security features activated on the client device, and so forth.

Client data-store 322(4) include a historical record of client data associated with one or more PP-TP applications and one or more client device(s). Particularly, the historical record of client data may be used to refine a PP-TP application data model 324 by aggregating client data associated with substantially similar PP-TP applications, client device types, and so forth.

Figure 4:
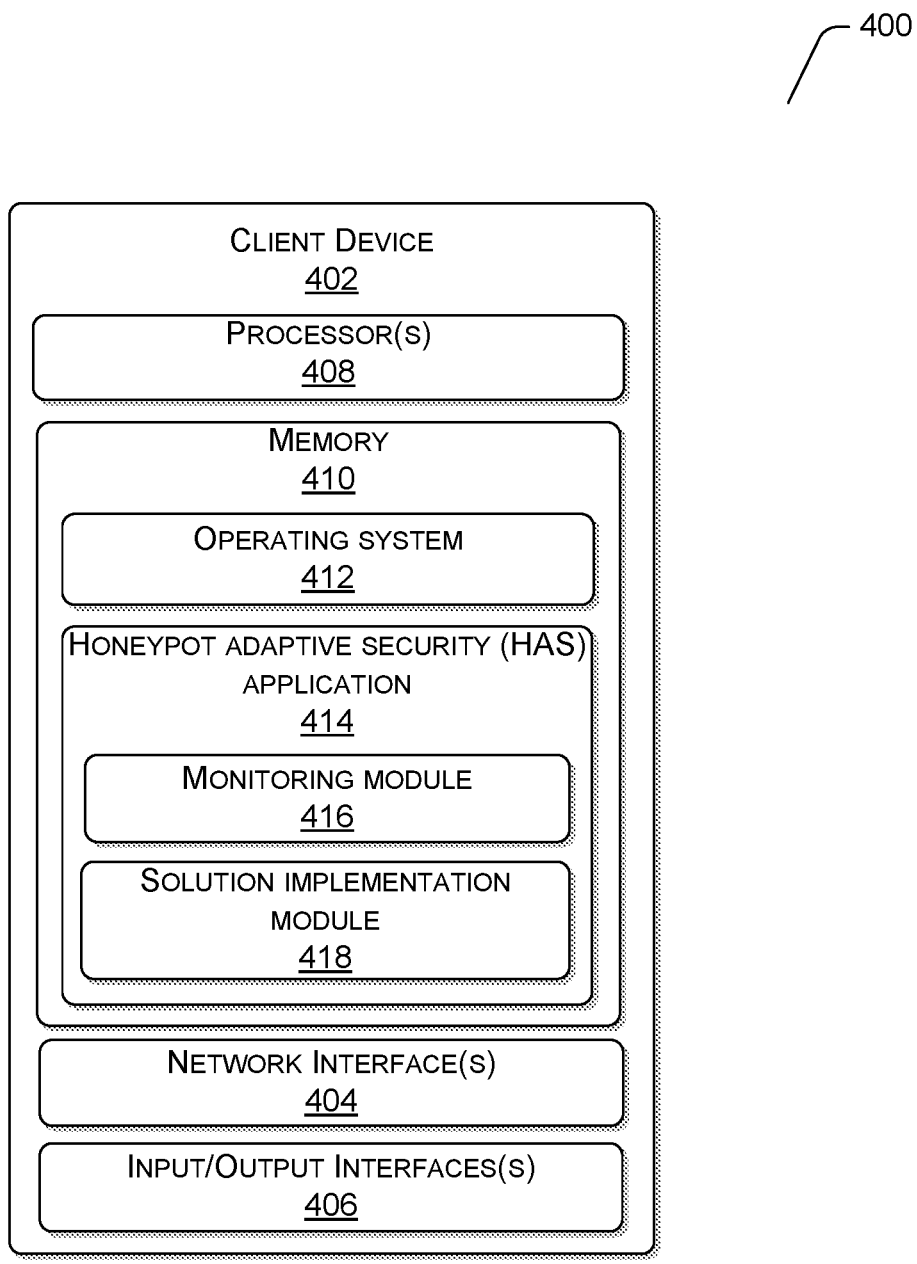
FIG. 4 illustrates a block diagram of a client device that interacts with the HAS system.

FIG. 4 illustrates a block diagram of a client device 402 that interacts with the HAS system 106. The client device 402 may correspond to client device 108 or 206. Particularly, the client device 402 may be communicatively coupled to the HAS system 106 via one or more network(s) 126, via network interface(s) 404. The network interface(s) 404 may correspond to network interface(s) 306. In this example, the client device 402 may transmit and receive data to and from the HAS system 106, via the network interface(s) 404. Particularly, the client device 402 may transmit client data that is associated with a PP-TP application on the client device 402. Client data may include records of network activity, file system activity, screen display activity, client device logs, system information associated with execution of the PP-TP application 104 on the client device, or any combination thereof. Further, the client device 402 may receive data, such as policy solutions from the HAS system 106 that is intended to warn or implement a corrective action for an over-privileged access of CCN data or client account features by a PP-TP application on the client device.

Moreover, the client device 402 may include input/output interface(s) 406 that transmit and receive data to and from the HAS system 106. The input/output interface(s) 406 may correspond to the input/output interface(s) 304. The client device 402 may include one or more processor(s) 408 operably connected to memory 410. The one or more processor(s) 408 may correspond to one or more processor(s) 308, and the memory 410 may correspond to the memory 310.

In the illustrated example, the memory 410 may include an operating system 412 and a honeypot adaptive security (HAS) application 414. The operating system 412 may be used to implement the HAS application 414. The operating system 412 may be any operating system capable of managing computer hardware and software resources. The HAS application 414 may include routines, program instructions, objects, and/or data structures that perform particular tasks or implement particular abstract data types.

The HAS application 414 may be configured to communicate with the HAS system 106. The HAS application 414 may further include a monitoring module 416 and a solution implementation module 418. The monitoring module 416 may be configured to selectively monitor data communications between the client device and the PP-TP application on the client device. Data communications may include network traffic via network interfaces, file system calls, or data transfers between the PP-TP application and components of the client device. The monitoring module 416 may further retrieve client data associated with the data communications, via a monitoring agent. Client data may include records of system activities associated with execution of PP-TP application on the client device, such as network activity, file system activity, screen display activity, client device logs, or any combination thereof.

Further, the monitoring agent may be instrumented in the operating system stack of the client device 402 at any location where data is exposed, such as, but not limited to, a graphic processor, volatile and non-volatile memory, disk storage, network interfaces, or input/output interfaces. In some examples, the monitoring agent may retrieve client data from the client device on a continuous basis, per a predetermined schedule, or in response to a triggering event. The predetermined schedule may be based on a time interval of thirty minutes, one hour, 12 hours, or 24 hours. Any time interval is possible. Further, the triggering event may correspond to receipt of an indication, from the HAS system 106, that at least one other client device has indicated an over-privileged use of CCN data or client account feature, by a PP-TP application executed on the client device.

The solution implementation module 418 may be configured to receive a solution data package from the HAS system 106. The solution data package may be operative to inform an end user of the client device 402 of an instance of over-privileged access to CCN data or client account features (i.e., exceeding a predetermined bandwidth allocation that is associated with the PP-TP application) by a PP-TP application. In this example, the solution data package may be received via a common short code (CSC) using a short message service (SMS), multimedia messaging service (MMS), an e-mail service, via audio communication service, or via a social media platform.

Alternatively, or additionally, the solution data package may include computer executable instructions that automatically execute a policy solution for a particular instance of over-privileged access on the client device 402. For example, the solution data package may automatically adjust network settings on a client device 402, client account settings associated with the client device 402, access privileges associated with a PP-TP application executed on the client device 402, or operating system settings on the client device 402.

Figure 5:
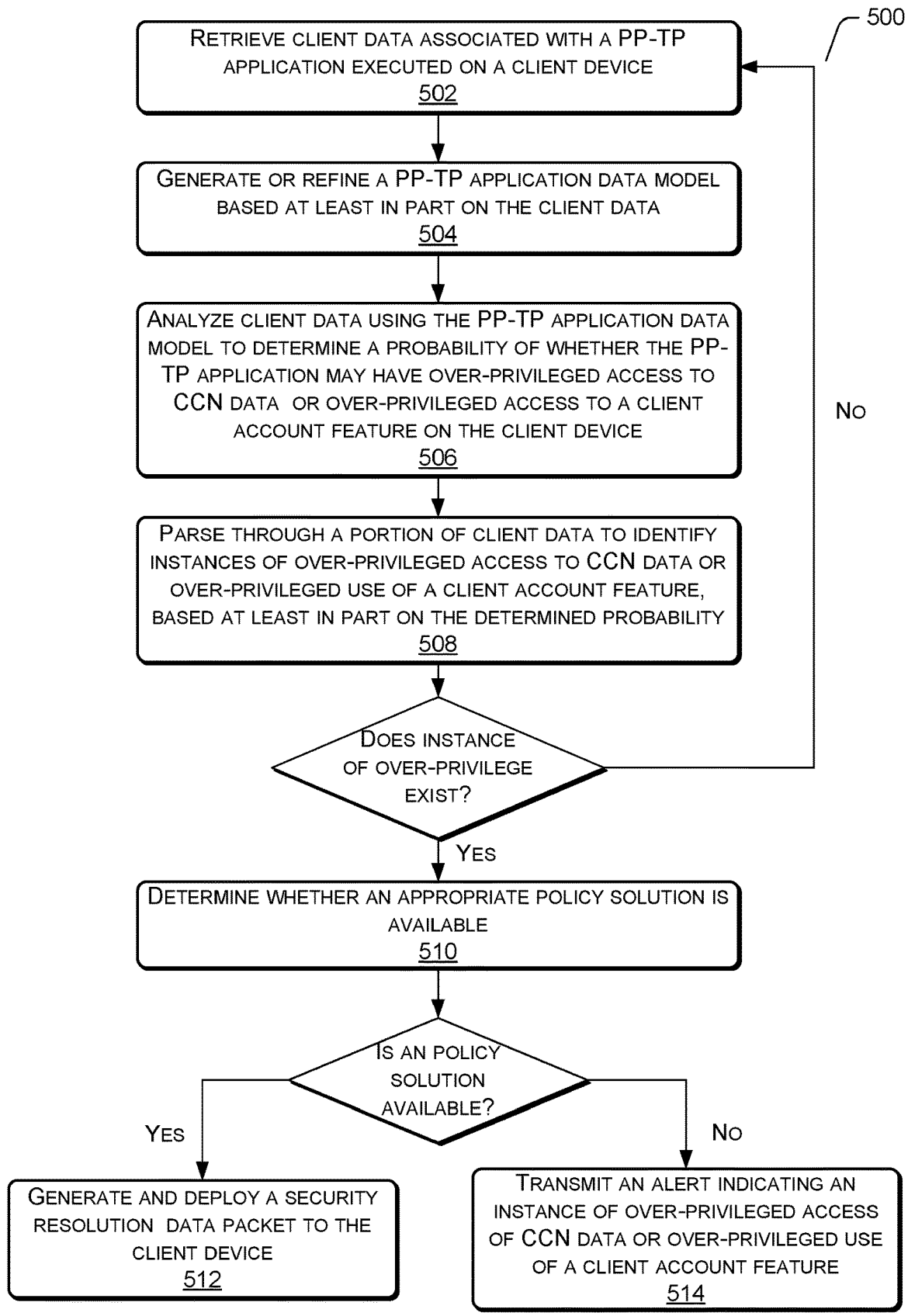
FIG. 5 illustrates a HAS system process to determine whether a PP-TP application has gained over-privileged access to CCN data or over-privileged access to client account feature on a client device.
Figure 6:
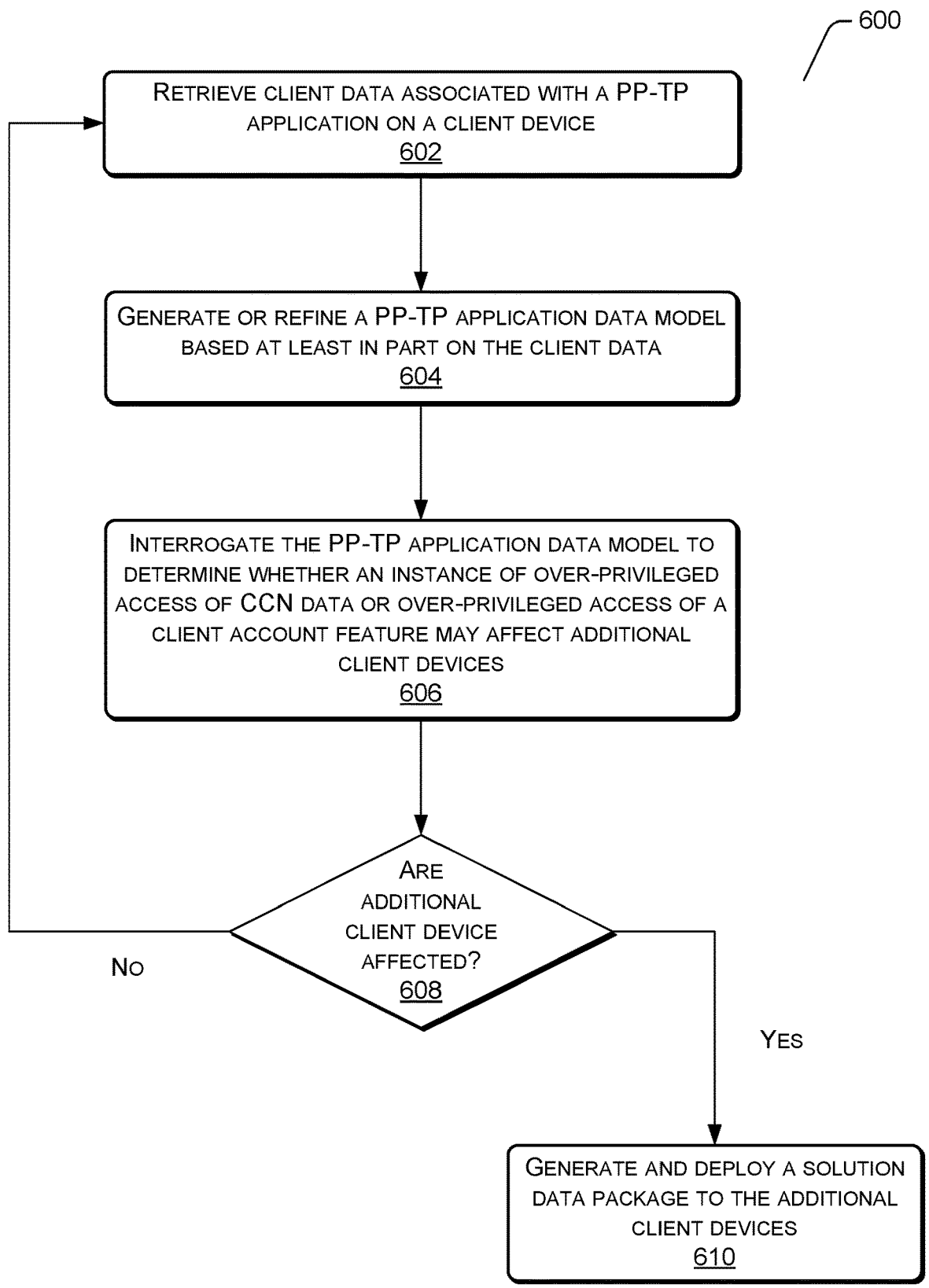
FIG. 6 illustrates a HAS system process to analyze a PP-TP application data model and determine whether additional client devices may be affected by a PP-TP application gaining over-privileged access of CCN data or over-privileged use of a client account feature.

FIGS. 5 and 6 present processes 500 and 600 that relate to operations of the Honeypot Adaptive Security System 106. Each of processes 500 and 600 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 500 and 600 are described with reference to the computing environment 100 of FIG. 1.

FIG. 5 illustrates a HAS system process to determine whether a PP-TP application has gained over-privileged access to CCN data or over-privileged access to client account features on a client device. Particularly, the HAS system may analyze client data associated with execution of a PP-TP application on a client device. In doing so, the HAS system may selectively generate and deploy a policy solution that resolves the instance of over-privileged access to CCN data or over-privileged access to client account features on a client device.

At 502, the HAS system retrieve client data associated with a PP-TP application executed on a client device. The HAS system may retrieve client data directly from an operating system stack of the client device, or a from a monitoring agent that is instrumented on the client device. The client data may include records of activities associated with execution of the PP-TP application on the client device, such as network activity, file system activity, screen display activity, client device logs, or any combination thereof.

At 504, the HAS system may generate or refine a data model associated with the PP-TP application, based at least in part on the client data. The data model may be used to determine emerging trends of systemic problems associated with the PP-TP application, its use of CCN data, or over-privileged access of client account features. The development of PP-TP application data model is an iterative process. In one example, client data from the client device may be aggregated with additional client data from other client devices. Further, the HAS system may include one or more of environmental parameters, device information, or policy rules to progressively refine the accuracy of the PP-TP application data model.

At 506, the HAS system may analyze the client data relative to the PP-TP application data model. Particularly, the HAS system may identify data patterns between the client data associated the PP-TP application executed on the client device, and the PP-TP application data model. In doing so, the HAS system may determine a probability of whether the PP-TP application may have over-privileged access to CCN data or over-privileged access to client account features (i.e., exceeding a predetermined bandwidth allocation that is associated with the PP-TP application) on the client device.

At 508, the HAS system may parse through a portion of client data to identify instances of over-privileged access to CCN data or over-privileged use of client account features, based at least in part on the determined probability. In one example, the HAS system may determine that the probability of client data including CCN data is greater than a predetermined threshold. In doing so, the HAS system may parse through substantially all client data to identify instances unauthorized access of CCN data or over-privileged use of client account features. Alternatively, the HAS system may parse through a portion, but not all, client data based at least in part on the determined probability being less than a predetermined threshold.

In another example, the HAS system may determine that the probability of over-privileged use of client account features (i.e., exceeding a predetermined bandwidth allocation that is associated with the PP-TP application) by the PP-TP application is greater than a predetermined threshold. In doing so, the HAS system may analyze portions of client data, such as client device logs, to quantify bandwidth consumption by the PP-TP application on the client device.

At 510, the HAS system may determine that an instance of over-privileged access to CCN data or over-privileged use of a client account feature has occurred. In this instance, the HAS system may determine whether a policy solution is available. Particularly, the HAS system may access a policy solution from a policy data-store to identify an appropriate policy solution for the instance of over-privileged access to CCN data or over-privileged use of client account features.

At 512, the HAS system may determine that a policy solution does exist for the instance of over-privileged access to CCN data or over-privileged use of a client account feature (i.e., exceeding a predetermined bandwidth allocation that is associated with the PP-TP application). In doing so, the HAS system may generate and deploy a solution data package that automatically executes a policy solution on the client device. In a non-limiting example, the policy solution may comprise of computer executable instructions that adjust network settings on a client device, access privileges associated with a PP-TP application, client account settings associated with the client device, operating system settings on the client device, or any combination thereof. Additionally, or alternatively, the solution data package may comprise of an alert that is intended to inform at least an end user of the client device of the likelihood (i.e., probability) that the PP-TP application has, or may gain, over-privileged access to CCN data or over-privileged use of a client account feature. Additionally, or alternatively, the HAS system may transmit the alert to a developer of the PP-TP application, a system administrator of a business enterprise associated with the end user of the client device 206 (i.e., information technology department), an administrator of the telecommunications service provider, or any combination thereof. The alert may indicate a policy solution has been applied to resolve an instance of over-privileged access to CCN data or over-privileged use of a client account feature.

At 514, the HAS system may determine that a policy solution does not exist for the instance of over-privileged access to CCN data or over-privileged use of a client account feature. In this example, the HAS system may generate and deploy an alert that is intended for at least one of the end user of the client device, a developer of the PP-TP application, or an administrator of telecommunications service provider. The alert may indicate an instance of over-privileged access to CCN data or over-privileged use of a client account feature has occurred, and that a policy solution is not available. Alternatively, or additionally, the HAS system may selectively generate a solution data package that automatically prevents execution of the PP-TP application on the client device, until a policy solution is available.

FIG. 6 illustrates a HAS system process to analyze a PP-TP application data model and determine whether additional client devices may be affected by a PP-TP application gaining over-privileged access of CCN data or over-privileged use of client account features. Particularly, the HAS system may identify data patterns within a PP-TP application data model that correlate characteristics, such as a geographic location, device type, network access point, or any combination thereof, with historical instances of a PP-TP application gaining over-privileged access of CCN data or over-privileged access of client account features. In doing so, the HAS system may identify a set of additional client devices based at least in part on the shared characteristics.

At 602, the HAS system may retrieve client data associated with a PP-TP application executed on a client device. The HAS system may retrieve the client data directly from an operating system stack of the client device, or a monitoring agent that is instrumented on the client device. Client data may include records (i.e., data logs) of system activities associated with execution of PP-TP application on the client device, such as network activity, file system activity, screen display activity, client device logs, or any combination thereof.

At 604, the HAS system may generate or refine a data model associated with the PP-TP application, based at least in part on the client data. The data model may be used to determine emerging trends of systemic problems associated with the PP-TP application, its use of CCN data, or over-privileged access to other client account features. In some examples, client data from the client device may be aggregated with additional client data from other client devices. Further, the HAS system may include one or more of environmental parameters, device information, or policy rules to progressively refine the accuracy of the PP-TP application data model.

At 606, the HAS system may interrogate the PP-TP application data model to determine whether an instance of over-privileged access to CCN data or over-privileged access to a client account feature may affect additional client devices. In short, the HAS system may identify data patterns within the PP-TP application data model that correlate characteristics, such as a geographic location, device type, network access point, or any combination thereof, with historical instances of a PP-TP application gaining over-privileged access of CCN data or over-privileged access of client account features.

In one example, the HAS system may determine a probability of whether the PP-TP application will affect additional client devices based on data patterns within the PP-TP application data model. The data patterns may correlate characteristics, such as geographic location, device type, network access point, or any combination thereof, with historical instances of a PP-TP application gaining over-privileged access to CCN data or over-privileged use of client account features.

At 608, the HAS system may determine whether additional client devices may be affected by an instance of a PP-TP application gaining over-privileged access of CCN data or over-privileged use of client account features, on a client device. The HAS system may identify the set of additional client devices based on the determined probability (i.e., whether the PP-TP application will affect additional client devices) being greater than a predetermined threshold.

At 610, the HAS system may determine that additional client devices are affected by an instance of the PP-TP application gaining over-privileged access of CCN data or over-privileged access of client account features. In doing so, the HAS system may pre-emptively generate and deploy a solution data package to the additional client devices. The solution data package is intended to mitigate instances over-privileged access to CCN data or over-privileged use of client account features on the additional client devices.

In one example, the solution data package may automatically execute a policy solution on the additional client devices. Particularly, the policy solution may comprise of computer executable instructions that adjust network settings on a client device, access privileges associated with a PP-TP application, client account settings associated with the client device, operating system settings on the client device, or any combination thereof. Alternatively, or additionally, the policy solution may comprise of an alert that is intended to inform at least an end user of the client device of the likelihood (i.e., probability) that the PP-TP application may gain over-privileged access to CCN data or over-privileged use of a client account feature. Additionally, or alternatively, the HAS system may transmit the alert to a developer of the PP-TP application or an administrator of the telecommunications service provider. Further, the alert may indicate that over-privileged access of CCN data or over-privileged use of client account features is based on characteristics such as geographic location, device type, network access point, or any combination thereof.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A system comprising:
one or more processors;
memory coupled to the one or more processors, the memory including one or more modules that are executable by the one or more processors to:
retrieve client data associated with an application on a client device, the client data including at least a record of system activities associated with execution of the application on the client device;
retrieve policy rules associated with the application, the policy rules identifying confidential client or network (CCN) data that is associated with the client device, the policy rules further identifying a first subset of CCN data that is accessible by the application and a second subset of CCN data to which access by the application is prohibited;
generate an application data model to quantify emerging trends of the application gaining over-privileged access to the second subset of CCN data on the client device, based at least in part on historical instances of the client data and the policy rules;
determine a probability that the application has gained over-privileged access to the second subset of CCN data, based at least in part on analysis of the client data relative to the application data model;
quantify a portion of the client data that is less than an entirety of the client data based at least in part on the probability being less than a predetermined threshold;
parse the portion of the client data to identify an instance of the application gaining over-privileged access to the second subset of CCN data;
generate a solution data package for deployment to the client device, the solution data package including a policy solution that automatically resolves the instance of the application gaining over-privileged access to the second subset of CCN data on the client device; and
deploy the solution data package to the client device.

2. The system of claim 1, wherein the one or more modules are further executable by the one or more processors to:
retrieve the client data on a continuous basis, at predetermined time intervals, or in response to a triggering event, the triggering event being receipt of an indication from an additional client device that the application has gained over-privileged access to the second subset of CCN data on the additional client device.

3. The system of claim 1, wherein the one or more modules are further executable by the one or more processors to:
deploy an application agent to the client device, the application agent being instrumented within an operating system stack of the client device to monitor file system activity and network activity associated with the application on the client device, and
wherein, to retrieve the client data is based at least in part on data transmissions from the application agent.

4. The system of claim 1, wherein the one or more modules are further executable by the one or more processors to:
retrieve, from a base station associated with a telecommunications network service, location data associated with the client device, based at least in part on a device identifier of the client device, the location data corresponding to a location of the client device at a point in time that the client data is retrieved, and
wherein, the client data includes the location data associated with the application on the client device includes the location data.

5. The system of claim 1, wherein the one or more modules are further executable by the one or more processors to:
retrieve, from an environmental parameters data-store, one or more environmental parameters that quantify characteristics that affect instances of the application gaining over-privileged access to the second subset of CCN data, the characteristics including a geographic location, a network access point, a device type, or historical instances of the application gaining over-privileged access to the second subset of CCN data; and
refine, the application data model, based at least in part on the one or more environmental parameters.

6. The system of claim 1, wherein the one or more modules are further executable by the one or more processors to:
retrieve, from a client data-store, historical client data associated with execution of the application on the client device and execution of the application on additional client devices, the historical client data including at least historical instances of the application gaining over-privileged access to the second subset of CCN data on the client device or the additional client devices; and
refine, the application data model based at least in part on the historical client data.

7. The system of claim 1, wherein the one or more modules are further executable by the one or more processors to:
retrieve, from a device information data-store, device information associated with the client device, the device information including a device type, device identifier, configuration of the client device; and refine, the application data model based at least in part on the device information.

8. The system of claim 1, wherein the one or more modules are further executable by the one or more processors to:
determine that the probability that the application has gained over-privileged access to the second subset of CCN data is greater than the predetermined threshold, and
wherein, the portion of the client data corresponds to an entirety of the client data, based at least in part on the probability being greater than the predetermined threshold.

9. A computer-implemented method, comprising:
under control of one or more processors:
retrieving, client data associated with execution of an application on a client device, the client data including data logs of data communications between the application and the client device;
retrieving, from one or more data-stores, policy rules and historical client data associated with the application, the policy rules identifying confidential client or network (CCN) data to which access by the application is prohibited, and the historical client data including historical instances of the application gaining over-privileged access to the CCN data;
generating an application data model to quantify emerging trends of the application gaining over-privileged access to the CCN data on the client device, based at least in part on the policy rules and the historical client data;
determining a probability that the application has gained over-privileged access to the CCN data, based at least in part on analysis of the client data relative to the application data model;
quantifying a portion of the client data that is less than an entirety of the client data based at least in part on the probability being less than a predetermined threshold;
parsing the portion of the client data to identify an instance of the application gaining over-privileged access to the CCN data;
generating a solution data package for deployment to the client device, based at least in part on identifying the instance of the application gaining over-privileged access to the CCN data; and
deploying the solution data package to the client device.

10. The computer-implemented method of claim 9, further comprising:
retrieving, from the one or more data-stores, device information associated with the client device and at least one environmental parameter associated with the application, the device information including at least one of a device type, device identifier, a firmware configuration of the client device, or an operating system configuration of the client device, and the at least one environmental parameter quantifying a characteristic that affects instances of the application gaining over-privileged access to the CCN data, the characteristic being one of a geographic location, device type, or network access point, and
wherein, generating the application data model is further based at least in part on the device information and the at least one environmental parameter.

11. The computer-implemented method of claim 9, further comprising:
determining an additional probability that a set of additional client devices are affected by the instance of the application gaining over-privileged access to the CCN data, based at least in part on the application data model; and
generating an additional solution data package for deployment to the set of additional client devices, based at least in part on the additional probability being greater than a predetermined threshold, the additional solution data package including a message intended to inform end users of the set of additional client devices of a likelihood of the application gaining over-privileged access to the CCN data.

12. The computer-implemented method of claim 9, further comprising:
retrieving, from the one or more data-stores, a policy solution that corresponds to the instance of the application gaining over-privileged access to the CCN data,
wherein, the solution data package includes computer-executable instructions that automatically executes the policy solution on the client device, and
wherein, the solution data package further including a message to at least the client device indicating that the instance of the application gaining over-privileged access to the CCN data has been resolved.

13. The computer-implemented method of claim 9, further comprising:
determining that a policy solution is not available for the instance of the application gaining over-privileged access to the CCN data, and
wherein, the solution data package includes a message indicating that the instance of the application gaining over-privileged access to the CCN data has occurred, the message being further transmitted to at least one of a developer associated with the application, a system administrator associated with an end user of the client device, a system administrator associated with a telecommunication service provider that facilitates communications via the client device, or the end user of the client device.

14. The computer-implemented method of claim 9, further comprising:
determining that a policy solution is not available for the instance of the application gaining over-privileged access to the CCN data, and
wherein, the solution data package for deployment to the client device includes computer-executable instructions that prevent execution of the application on the client device.

15. The computer-implemented method of claim 9, further comprising:
determining that the probability of the application has gained over-privileged access to the second subset of CCN data is greater than the predetermined threshold, and
wherein, the portion of the client data corresponds to an entirety of the client data, based at least in part on the probability being greater than the predetermined threshold.

16. One or more non-transitory computer-readable media storing computer-executable instructions that, when executed on one or more processors, cause the one or more processors to perform acts comprising:
retrieving client data associated with an application on a client device, the client data including access to portions of client account features to facilitate execution of the application on the client device, the client account features including at least a quality of service feature or a network accessibility feature;

retrieving policy rules associated with the application, the policy rules identifying permissible use of the client account features by the application on the client device;

retrieving historical instances of client data associated with execution of the application on the client device;

generating an application data model that quantifies emerging trends of the application gaining over-privileged access to the client account features, based at least in part on the historical instances of client data and the policy rules;

determining a probability that the application has gained over-privileged access to the client account features, based at least in part on analysis of the client data relative to the application data model;

parsing a portion of the client data that is less than an entirety of the client data to identify an instance of the application gaining over-privileged access to the client account features, based at least in part on the probability being less than a predetermined threshold;

generating a solution data package for deployment to the client device, the solution data package to resolve the instance of the application gaining over-privileged access to the client account features on the client device; and deploying the solution data package to the client device.

17. The one or more non-transitory computer-readable media of claim 16, wherein the client data further includes system activities associated with execution of the application on the client device and the policy rules further identify confidential client or network (CCN) data associated with the client device, and further comprising:

determining an additional probability that the application has gained over-privileged access to the CCN data, based at least in part on the application data model;

quantifying an additional portion of the client data relative to an entirety of the client data based at least in part on the additional probability; and parsing the additional portion of the client data to identify an instance of the application gaining over-privileged access to the CCN data.

18. The one or more non-transitory computer-readable media of claim 16, further comprising:

deploying an application agent to the client device, the application agent to initiate retrieval of the client data, the application agent being instrumented on one of an operating system stack, a graphic processor, a volatile or non-volatile memory, a disk storage component, a network interface, or an input-output interface of the client device.

19. The one or more non-transitory computer-readable media of claim 16, wherein the client data further comprises data logs of network activity, file system activity, screen display activity, client device logs, or system information that is associated with execution of the application on the client device.

20. The one or more non-transitory computer-readable media of claim 17, further comprising:

retrieving additional historical instances of client data associated with execution of the application on additional client devices;

retrieving at least one environmental parameter associated with the application, the at least one environmental parameter quantifying a characteristic that affects instances of the application gaining over-privileged access to the CCN data, the characteristic being one of a geographic location, device type, or network access point; and refining, on a continual basis, the application data model based at least in part on the additional historical instances of client data and the at least one environmental parameter.

* * * * *